United States Patent [19]

Gerben et al.

[11] 4,359,153
[45] Nov. 16, 1982

[54] THREE AXIS TRANSFER APPARATUS

[75] Inventors: Ralph D. Gerben, Glen Burnie; Harry J. Walters, Fallston, both of Md.

[73] Assignee: M. S. Willett, Inc., Hunt Valley, Md.

[21] Appl. No.: 166,931

[22] Filed: Jul. 8, 1980

Related U.S. Application Data

[63] Continuation of Ser. No. 919,591, Jun. 27, 1978, Pat. No. 4,256,218.

[51] Int. Cl.³ .............................................. B65G 25/02
[52] U.S. Cl. ..................................... 198/621; 414/750
[58] Field of Search ...................... 414/749, 750, 751; 198/621

[56] References Cited

U.S. PATENT DOCUMENTS

| | | | |
|---|---|---|---|
| 3,011,464 | 12/1961 | Danly et al. | 198/621 X |
| 3,430,782 | 3/1969 | Henkel | 198/621 X |
| 3,521,761 | 7/1970 | Wallis | 198/621 X |
| 3,620,381 | 11/1971 | McCaughey | 198/621 X |
| 3,707,908 | 1/1973 | Merk et al. | 414/749 X |
| 3,910,422 | 10/1975 | Zierpka | 198/621 X |
| 4,032,018 | 6/1977 | Wallis | 414/750 |

FOREIGN PATENT DOCUMENTS

| | | | |
|---|---|---|---|
| 1298621 | 6/1962 | France | 414/750 |
| 1027283 | 4/1966 | United Kingdom | 198/621 |

Primary Examiner—Leslie J. Paperner
Attorney, Agent, or Firm—James C. Wray

[57] ABSTRACT

A transfer has gripper bars capable of grasping, lifting and transferring a work piece. The grasping and lifting motions are actuated by face cams. The face cams act through rocker arm linkages connected to rotatable rods having arms connected to the gripper bars. The transferring motion is actuated by a barrel cam having an axial cam curve positioned between cam followers. A lifting frame has diagonal slots which receive guide pins connected to a base frame. A rack and pinion assembly connected to the gripper bars facilitates the gripping motion. Slidably mounted blocks with toothed wheels supporting arms of various radial extension provide variable travel distances for the gripper bar when moving in the transfer direction.

5 Claims, 9 Drawing Figures

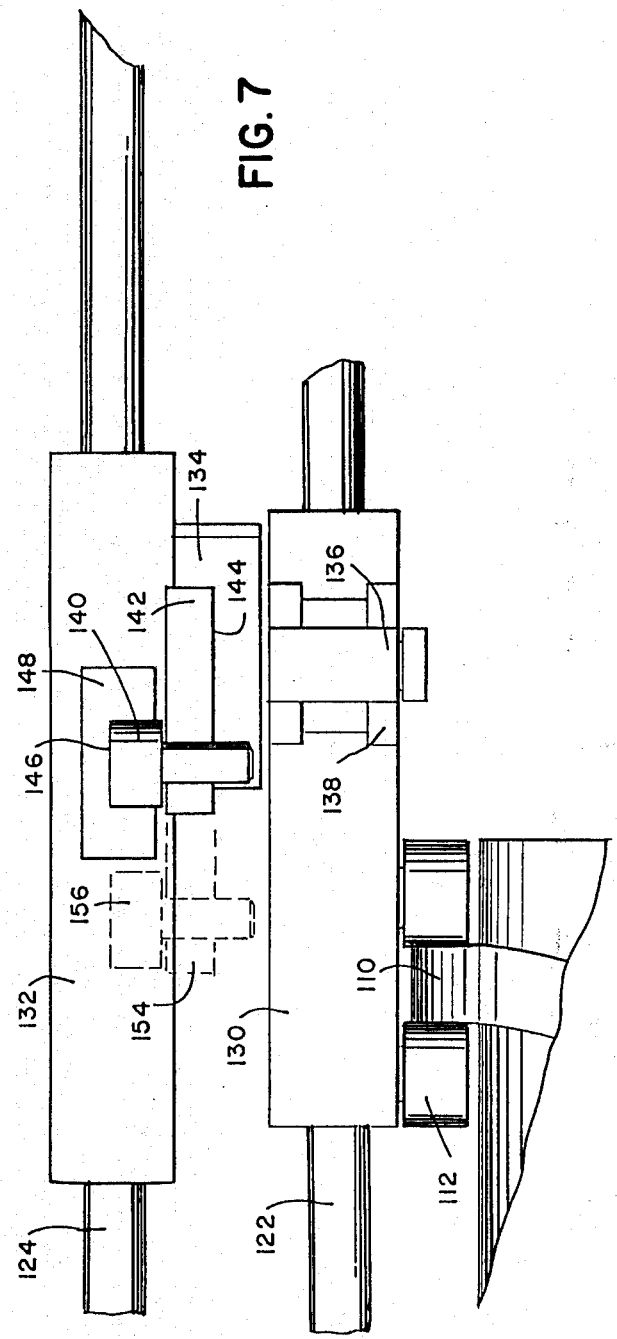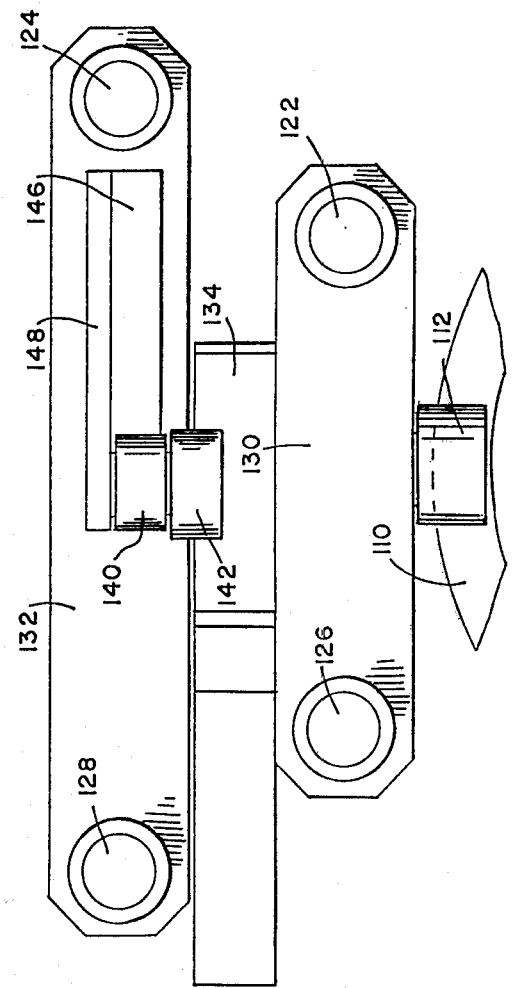

THREE AXIS TRANSFER APPARATUS

This application is a continuation, of application Ser. No. 919,591, filed June 27, 1978, now U.S. Pat. No. 4,256,218.

BACKGROUND OF THE INVENTION

This invention relates generally to material-handling devices and more particularly has reference to a reciprocating transfer device for transporting work pieces.

DESCRIPTION OF THE PRIOR ART

Pertinent United States and foreign patents are found in the official classifications of patents in the United States Patent and Trademark Office. Examples of pertinent patents are U.S. Pat. Nos.:

3,528,575
3,620,381
3,655,070
3,707,908
3,753,489
3,756,425
3,910,422

German Pat. Nos. 1,150,644; 1,201,245; 1,802,629; 1,802,630 and 2,349,126 and French Pat. No. 1,298,621.

U.S. Pat. No. 3,910,422 shows a feeding arrangement for transporting work pieces having a pair of gripper bars extending along the transport path. The bars are movable separately from one another in the feed direction, transversely to the feed direction and in the vertical direction. Three cams on a common shaft are used for generating the gripper bar motions. A lifting frame is provided with a cam follower to generate the vertical motion.

German Pat. Nos. 1,802,629 and 1,802,630 disclose devices for transporting work pieces. The devices have parallel bars movable in the feed direction with gripper tongs movable in a transverse direction. The transverse movement of the tongs is transmitted by linkages. Lifting devices spaced apart lengthwise along the transport path are driven by means of gear racks through suitable transmissions converting the horizontal drive motions into vertical lifting motions.

French Pat. No. 1,298,621 shows a transfer device with gripper bars operating in a three axis cycle. Motion is derived from three cams located on a common drive shaft. The motions derived from the cams are transmitted through gear trains and linkages to the gripping bars.

U.S. Pat. No. 3,655,070 shows a transfer and lift mechanism wherein multiple cams generate movement of gripper fingers.

In U.S. Pat. No. 3,756,425, work piece gripping finger bars are supported for transverse movement on a carriage which is slidably movable lengthwise of a press. An axially shiftable rod extends lengthwise through the carriage. The movement is cam operated.

U.S. Pat. No. 3,620,381 shows a horizontal high speed transfer having spaced carrier bars with inward article receiving configurations. The carrier bars are mounted on supports for longitudinal and transverse movement.

U.S. Pat. No. 3,528,575 shows a high speed transfer having reciprocating multiple stepped single blank feeding plates with cooperating blank holders. Recessed transfer bars with spring loaded gripping fingers reciprocate differentially with respect to cammed lifting bars which are slidably connected to the transfer bars. Feed, transfer bars and lifting bars are interrelated with cams and levers which coordinate their movement.

German Pat. No. 1,150,644 shows an intermitent feed device with at least one pair of gripper jaws arranged in mirror image fashion to the feed axis. The gripper jaws are controlled by rods that are rotatable and moves to and fro.

German Pat. No. 1,201,245 shows a transfer mechanism for work pieces having an arm hanging down from a reciprocating carriage and pivotable about its long axis. The arm is fitted with a work piece holder. The arm is controlled by swivel members which enable the arm to adapt to irregular work pieces. The carriage mounts a motor driven lifting device. The gripper has several descending work pieces hookers with limited pivotal movement controlled by levers and connecting rods.

U.S. Pat. No. 3,753,489 shows a transfer apparatus having laterally spaced horizontally extending transfer rails. Loading and unloading carriers movable in a cyclic rectangular motion are disposed between the transfer rails. Forks secured to the carriers move the work pieces.

U.S. Pat. No. 3,707,908 shows a transfer press having a series of rams arranged at successive stations along the length of the press for subjecting a work piece in succession to a number of pressing operations. A transfer device is associated with at least one of the press rams and is mounted on a support movable from and into an operative position.

Many problems remain the prior art devices. One problem is the lack of any convenient means for varying the feed travel distance of the gripper bars. Such a feature is essential for adapting the transfer apparatus to different assembly processes and work station arrangements. Another problem is the lack of a simple mechanism for simultaneously moving both gripper bars in a transverse direction. Such movement capability is, of course, essential to enable the gripper bars to securely grasp the work piece. Another problem is the absence of any simple mechanism for constraining the gripper bar lifting frame for vertical movement. Another problem is the lack of a motive system actuating component which performs reliably, is constructed easily and can be readily adapted and designed to actuate the motive systems in any desired manner and sequence.

SUMMARY OF THE INVENTION

The present invention overcomes the problems which exist in the prior art devices. The present invention provides, in preferred form, a transfer having gripper bars capable of grasping, lifting and transferring a work piece. The grasping and lifting motions are actuated by face cams. The face cams act through linkages connected to rotatable rods having arms connected to the gripper bars. Cam grooves formed in the face cams determine the manner in which the gripper bars move in the grasping and lifting directions. The transferring motions is actuated by a barrel cam having an axial curved cam ridge positioned between cam followers. The barrel cam and the face cams are mounted concentrically on a common shaft and, because of this, the three movements of the gripper bars can be readily coordinated. A lifting frame has diagonal slots which receive guide pins connected to a base frame. This pin and slot arrangement constrains the lifting frame for vertical movement. A rack and pinion assembly is connected to the gripper bars to facilitate the gripping motion. The rack and pinion enables the gripper bars to grasp the work piece by moving both gripper bars transversely simultaneously. Slidably mounted blocks with toothed wheels supporting arms of various radial extension provide variable travel distances for the gripper bars moving in the transfer direction.

OBJECTS OF THE INVENTION

Objects of the present invention are to provide an improved transfer, to provide a transfer capable of three axis motion, to provide a transfer actuated by face cams, to provide a transfer actuated by barrel cams, to provide a transfer having an uncomplicated lifting system, to provide a transfer having gripper bars capable of simultaneous transverse movement, to provide a transfer having an uncomplicated mechanism for moving the gripper bars transversely simultaneously, and to provide a transfer having a variable travel distance in the feed direction.

Another object of the invention is to provide a transfer having a pair of spaced gripper bars extending along a transport path, axial moving means connected to the gripper bars for moving the gripper bars in the direction of the transport path, vertical moving means connected to the gripper bars for moving the gripper bars in the vertical direction, transverse moving means connected to the gripper bars for moving the gripper bars transversely to the transport path, cam drive means having three cams, each of said cams connected to a different one of said moving means for generating the gripper bar motion associated with said moving means to which said cam is connected, wherein at least one of the cams is a face cam having a cam groove.

These and other and further and further objects and features of the invention are apparent in the disclosure which includes the above and below specifications and claims and drawings.

BRIEF DESCRIPTION OF THE DRAWINGS

FIG. 7 is a cross sectional side elevation of the transfer multiplier assembly.

FIG. 8 is a cross sectional end view of the transfer multiplier assembly shown in FIG. 7.

DETAILED DESCRIPTION OF THE DRAWINGS

Figure 1:
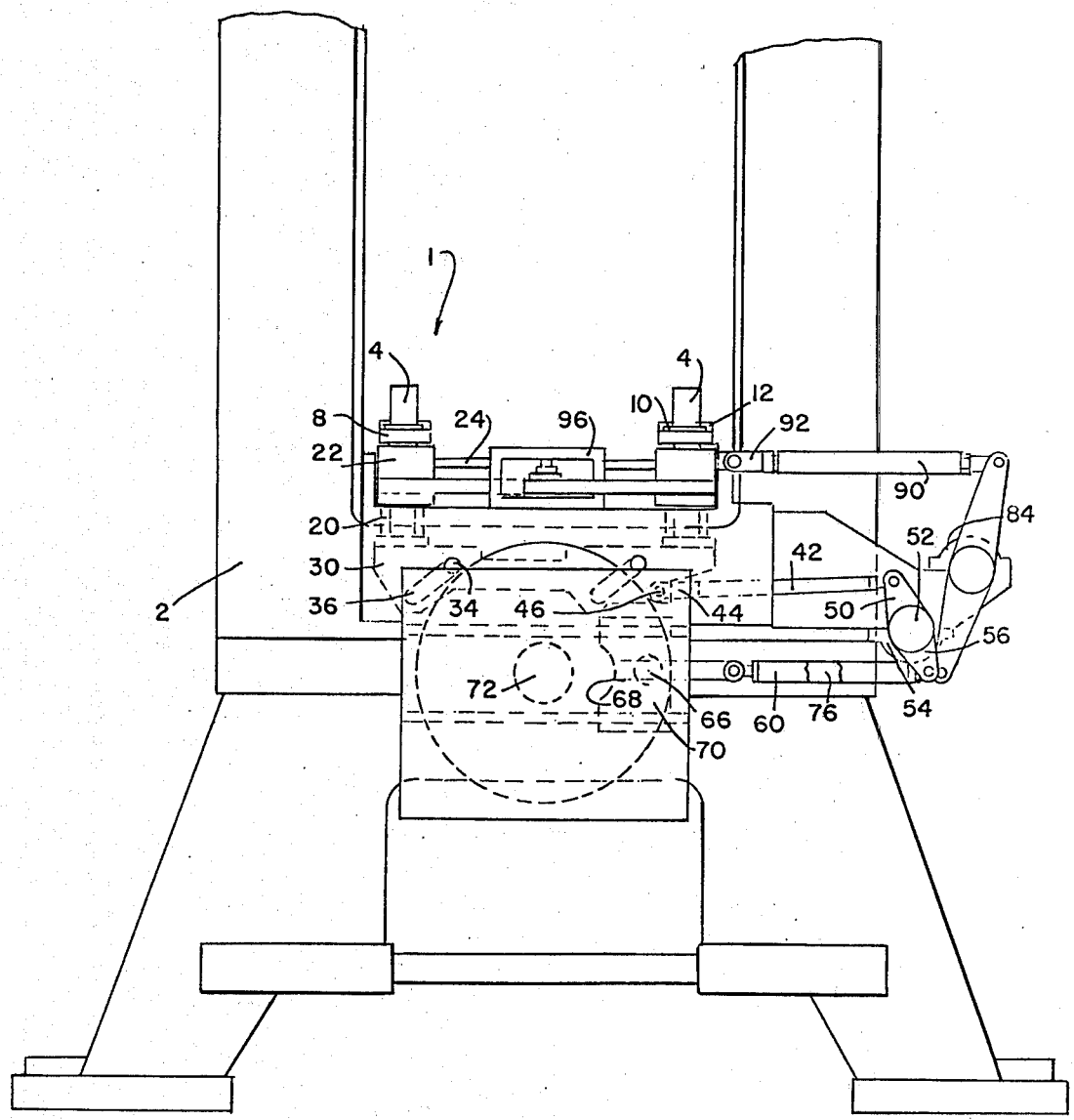
FIG. 1 is a cross sectional end elevation of the transfer device.
Figure 2:
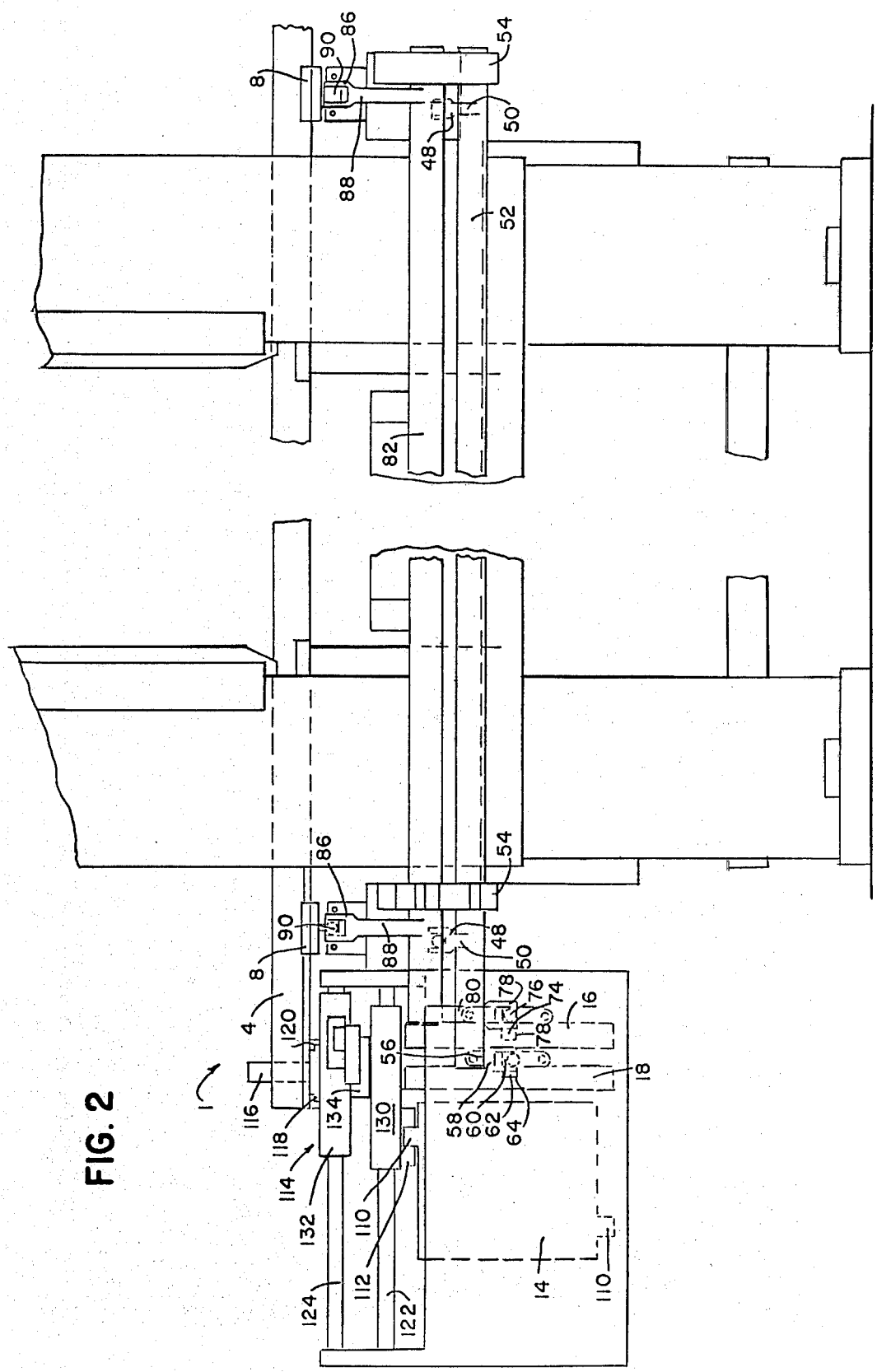
FIG. 2 is a cross sectional side elevation of the transfer device shown in FIG. 1.
Figure 3:
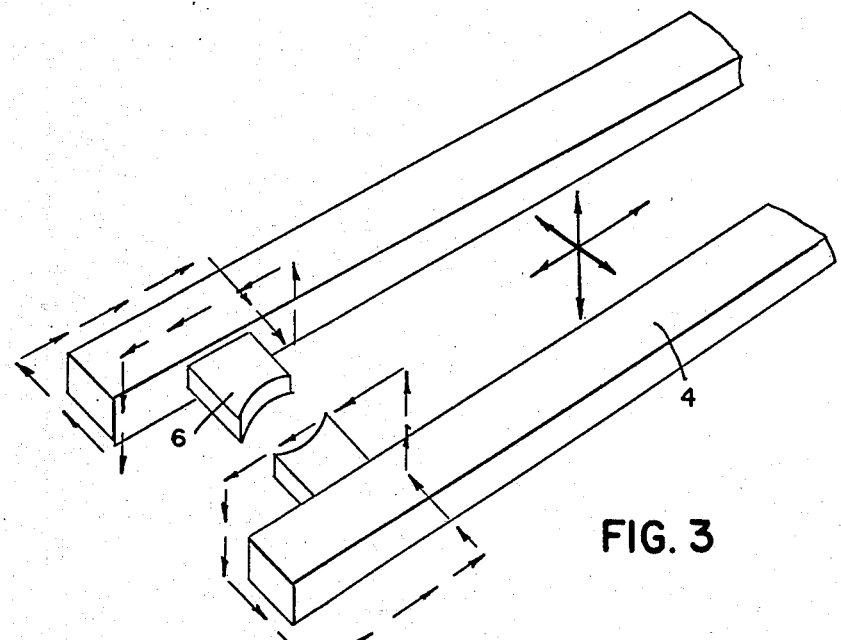
FIG. 3 is a perspective view of the gripper bars.
Figure 4:
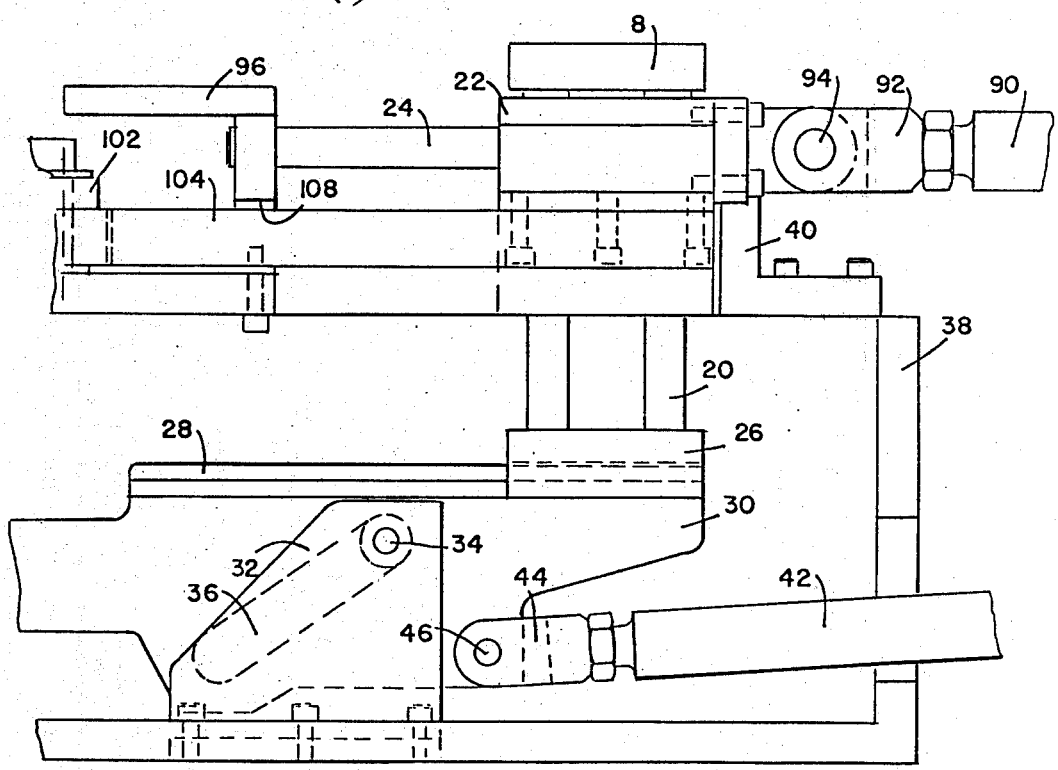
FIG. 4 is a cross sectional end elevation of a portion of the lifting frame, base frame and rack and pinion.
Figure 5:
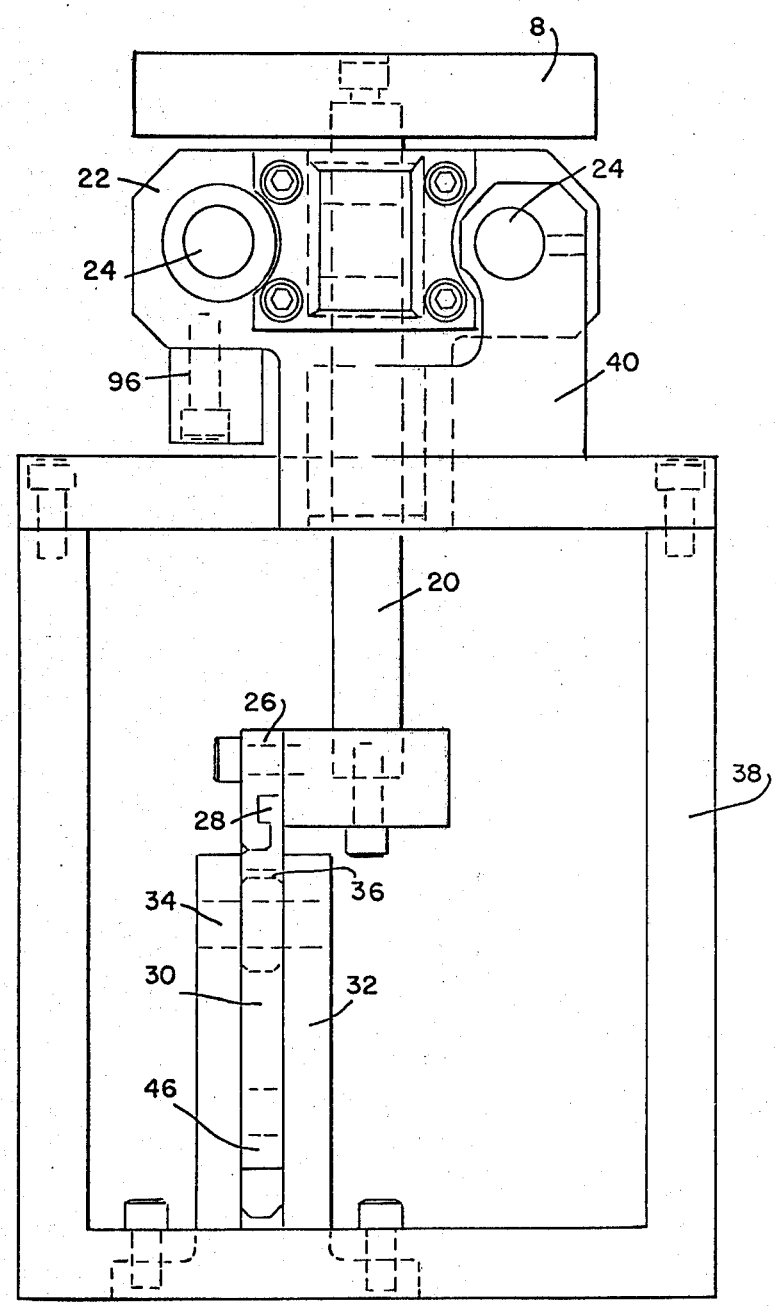
FIG. 5 is a cross sectional side elevation of the portion of the transfer device shown in FIG. 4.

Referring to FIG. 1, the transfer of the present invention is indicated generally by numeral 1. The transfer 1 is supported by a chassis 2. As will become apparent, the general purpose of transfer 1 is to advance a work piece from station to station along a transport path.

The transport 1 has a pair of spaced parallel gripper bars 4 positioned along opposite sides of a transport path. The bars 4 are provided with fingers 6 configured to engage the work pieces. The bars 4 are mounted on support platforms 8 capable of vertical and transverse movement with respect to the transport path. The bars 4 are supported by the platforms 8 at points adjacent each end of the transport path. The bases of the gripper bars 4 are provided with outwardly extending flanges 10 slidably received within L brackets 12 connected to the support platforms 8 to enable the bars 4 to move axially along the transport path.

Generally, the gripper bars 4 are capable of axial, vertical and transverse movement. These three motions are actuated by separate cams 14, 16 and 18 operationally associated with separate axial, vertical and transverse motive systems. The three motive systems are functionally and structurally interrelated.

As already noted, the support platforms 8 are capable of vertical movement. The platforms 8 are supported by vertical posts 20 which extend through blocks 22 slidably mounted on guide rods 24. The lower ends of the posts 20 are connected to slide brackets 26. The slide brackets 26 engage corresponding slide brackets 28 formed on the upper end of a lifting frame 30. The lifting frame 30 is positioned between spaced parallel plates 32 supporting guide pins 34 projecting through diagonal slots 36 formed in the lifting frame 30. The plates 32 and the block supporting guide rods 24 are mounted on a box frame 38. The guide rods 24 are connected to the box frame 38 by L-brackets 40.

The plates 32 and the guide pins 34 constrain the lifting frame 30 for vertical movement. Link arms 42 are provided at one end with clevises that are privotably connected to the lower end of the lifting frame 30 by pivot pins 46. The remote ends of the link arms 42 are pivotably connected to clevises 48 formed on the ends of arms 50 extending radially from rotatable rods 52. The rods 52 are journaled in brackets 54 mounted on the chassis 2. A radially extending arm 56 terminating outwardly in a clevis 58 is formed on one end of the rotatable rod 52. The clevis 58 is pivotably connected to a link arm 60. The remote of the link arm 60 is connected to a cam follower 62 configured to engage a cam groove 64 formed in face cam 18. Cam follower 62 is constrained for linear movement by a guide pin 66 received in a slot 68 in a guide bracket 70. The face cam 18 is rotatably mounted on a shaft 72.

The operation of the lifting system can now be readily understood. As the face cam 18 is rotated, the cam follower 62 reciprocates linearly. The reciprocating motion is communicated to the rotatable rod 52 by the link arm 60 and clevis arm 56. The resulting rotational reciprocating movement of the rod 52 causes the link arm 42 to reciprocate linearly. The linear movement of the link arm 42 acts on the lifting frame 30 and causes the lifting frame 30 to move vertically. The gripper bars 4 are connected to the lifting frame 30 by the support platforms 8 and move vertically with the lifting frame 30.

The transverse motive system is similarly actuated by a face cam 16 mounted on the shaft 72 coaxially with the vertical actuating face cam 18. A cam follower 74 pivotably connected to a link arm 76 is received in a cam groove 78 formed in the face cam 16. The cam follower 74 is constrained for linear movement by the guide pin 66 and guide bracket 70. The link arm 76 is pivotably connected to a clevis 78 formed on the end of an arm 80 extending radially from one end of a rod 82 rotatably journaled in chassis brackets 84. The rod 82 is substantially coextensive with the rotatable rod 52 and the gripper bars 4. Clevises 86 formed on the ends of arms 88 extending radially at each end of the rod 82 are pivotably connected to one end of link arms 90. The remote ends of the link arms 90 are provided with clevises 92 that are pivotably connected to pivot pins 94 mounted on the blocks 22. As previously mentioned, the blocks 22 are slidably mounted on guide rods 24 connected to the box frame 38 by the L-bracket 40 and pinion housing 96.

The operation of the transverse motive system can now be readily understood. As the face cam 16 is rotated, a reciprocating rotational movment is imparted to the rod 82. The rod 82 acts on the link arm 90 and causes the link arm to reciprocate linearly. The movement of the link arm 90 causes the block 22 to slide along the guide rod 24. The slide brackets 26 and 28 permit the block 22 to move transversely with respect to the lifting frame 30. The gripper bars 4 are mounted on the support platforms 8 and move transversely with the blocks 22 as the blocks act on the support platform posts 20.

Figure 6:
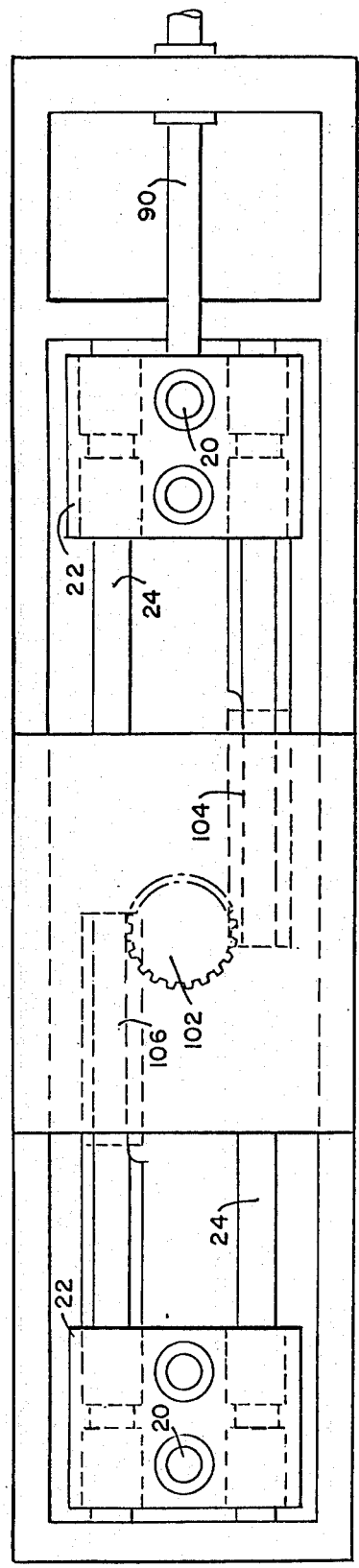
FIG. 6 is a sectional plan view of the rack and pinion assembly.

A rack and pinion assembly indicated generally by the numeral 100 is shown in FIG. 6. The assembly 100 communicates transverse motion from the blocks 22 connected to the link arms 90 to the blocks 22 positioned on the opposite side of the transport path. A pinion 102 is rotatably mounted in the pinion housing 96. Racks 104 and 106 connected to the blocks 22 extend through openings 108 formed in the pinion housing 96. The racks 104 extending from the blocks 22 connected to the link arms 90 engage the side of the pinion 102 opposite the side engaged by the racks 106 extending from the blocks 22 positioned on the opposite side of the transport path. As the blocks 22 connected to the link arms 90 are moved transversely, the rack 104 causes the pinion 102 to rotate. The pinion 102 acts on the rack 106 connected to the blocks 22 on the opposite side of the transport path and causes the blocks 22 to move transversely simultaneously.

The axial feed motion system is actuated by a barrel cam 14. The cam 14 is provided with an axial curve cam ridge 110 positioned between cam followers 112 connected to a transverse multiplier assembly 114. Posts 116 mounted on the upper surface of the multiplier assembly 114 project through holes formed in one end of the gripper bars 4. The bases of the posts 116 have outwardly extending flanges 118 held against the multiplier assembly 114 by L-brackets 120. The posts 116 are thus free to move transversely with respect to the transfer multiplier assembly 114 and the transport path. The posts 116 are loosely received by the holes in gripper bars 4 to permit the gripper bars 4 to move vertically with respect to the transfer multiplier assembly 114 and transport path.

Figure 9:
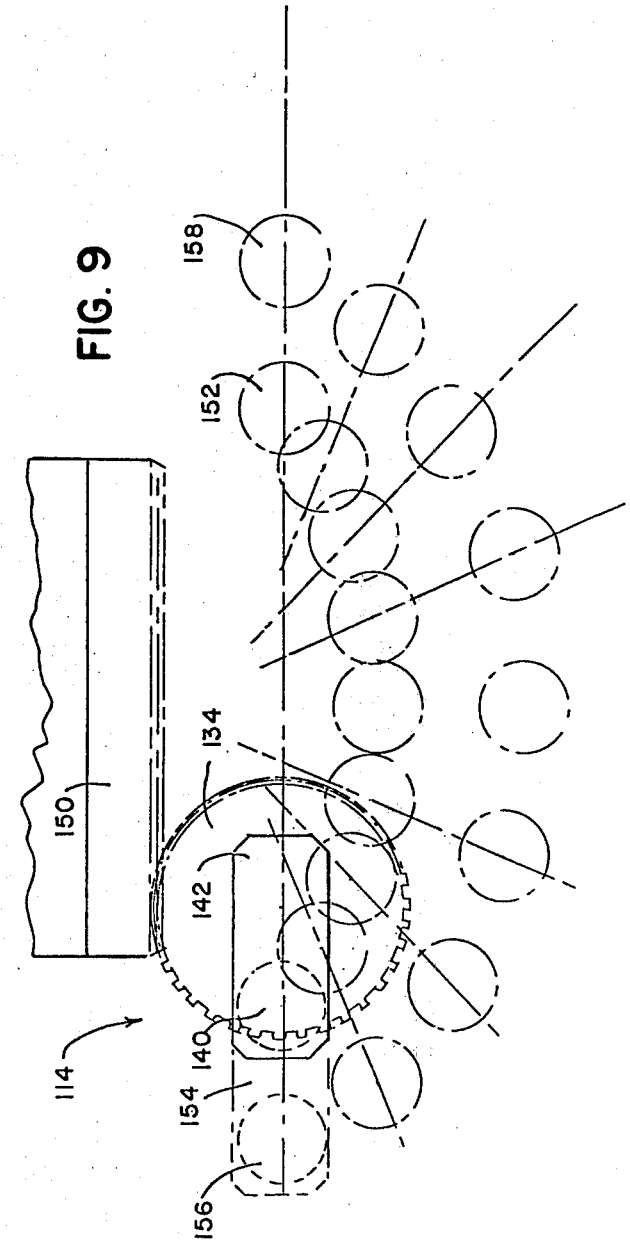
FIG. 9 is a sectional plan view of the transfer multipler assembly shown in FIG. 7 showing the travel path of two inserts with different lengths usable with the transfer multipler assembly.

The transfer multiplier assembly 114 is shown in further detail in FIGS. 7-9. Spaced parallel guide rods 122, 124, 126 and 128 are supported by the chassis 2. A lower block 130 is slidably mounted on the lower guide rods 122 and 126 and an upper block 132 is slidably mounted on the upper guide rods 124 and 128. The gripper bar engaging posts 116 are mounted on the upper surface of the upper block 132. The guide rods 122, 124, 126 and 128 are oriented to permit the blocks 130 and 132 to move axially with respect to the transport path. A toothed wheel 134 has a shaft 136 journaled for rotation in a bearing 138 mounted in the lower block 130. A follower 140 is mounted on the radially outward end of an insert 142 which is removably held within a notch 144 formed in the toothed wheel 134. The follower 140 is received in a transverse channel 146 formed in the bottom of a bearing insert 148 mounted in the upper block 132. A stationary rack 150 operatively engages the toothed wheel 134.

The operation of the transfer multiplier assembly 114 is best understood by reference to FIGS. 7 and 9. As the lower block 130 is moved axially along the lower guide rods 122 and 126, the rack 150 acts on the toothed wheel 134 causing the wheel 134 to rotate. Since the follower 140 is held radially outwardly from the axis of rotation of the toothed wheel 134, the follower 140 moves in the arcuate path 152 shown in FIG. 9. The movement of the follower 140 in the transverse channel 146 causes the upper block 132 to slide axially along the upper guide rods 124 and 128.

The axial travel distance of the upper block 132 is increased by replacing the insert 142 with a similar insert 154 having an increased radial length. The follower 156 is held by the replacement insert 154 a greater distance from the axis of rotation of the toothed wheel 144 than the follower 140 is held by the insert 142. Movement of the lower block 130 along the lower guide rods 122 and 126 causes the replacement follower 156 to move in the arcuate path 158 shown in FIG. 9. The arcuate path 158 has a greater radius than the arcuate path 152. Consequently, the axial travel distance of the upper block 132 is increased without any increase in the axial travel distance of the lower block 130.

The operation of the entire axial feed motion system can now be readily understood. As the barrel cam 14 is rotated, the cam ridge 110 acts on the cam followers 112 and moves the lower block 130 along the lower guide rods 122 and 126. The axial movement of the lower block 130 is communicated to the upper block 132 by the operation of the transfer multiplier assembly just described. The gripper bars 4 are connected to the upper block 132 by the posts 116 and move axially with the upper block 132 along the transport path. The L brackets 12 used to mount the gripper bars 4 on the support platforms 8 permit the gripper bars 4 to move axially with respect to the support platforms 8.

The operations of the three motive systems are coordinated by mounting the barrel cam 14 and the face cams 16 and 18 coaxially on a common shaft 72. The three cams 14, 16 and 18 are rotated simultaneously by the shaft 72. By proper design of the cam ridge 110 and the cam grooves 64 and 78 the three motive systems can operate in any desired sequence. As previously noted, the gripper bar mountings are designed to permit movement of the gripper bars 4 in the axial, transverse and vertical directions. The mountings are further designed to permit the gripper bars 4 to move in two or three directions simultaneously.

In practice, the transfer 1 is used to move work pieces from station to station along a longitudinal transport path. Initially, a work piece is placed in the path at the first station. The gripper bars 4 extend longitudinally along both sides of the transport path. The cams are designed so that the gripper bars 4 move transversely inwardly to bring the fingers 6 into contact with the work piece. The bars 4 are then moved vertically to a plane above the transport path. Axial movement of the bars 4 advances the work pieces to the next station. The bars 4 are lowered to place the work piece on the transport path adjacent the new station. A transversely outwardly movement of the bars 4 releases the work piece and positions the bars at the sides of the transport path. The bars 4 are then moved axially to their initial position. This cycle of movements is then repeated for each succeeding work piece.

If desired, the gripper bars 4 can be provided with a plurality of axially spaced fingers 6 positioned to engage work pieces adjacent a series of stations longitudinally spaced along the transport path. With each cycle of the transport 1, all of the work pieces on the transport path are simultaneously advanced to the next succeeding station.

While the invention has been described with reference to a specific embodiment, the exact nature and scope of the invention is defined in the claims which follow.

What is claimed is:

1. Transfer apparatus comprising
a pair of spaced gripper bars extending along a transport path.
axial moving means connected to the gripper bars for moving the gripper bars in the direction of the transport path,
vertical moving means connected to the gripper bars for moving the gripper bars in the vertical direction,
transverse moving means connected to the gripper bars for moving the gripper bars transversely to the transport path,
cam drive means having three cams, each of said cams connected to a different one of said moving means for generating the gripper bar motion associated with said moving means to which said cam is connected,
said transverse moving means comprising,
a pinion rotatably mounted on a vertical axis between the gripper bars,
horizontal racks connected to transversely slideable blocks and extending inwardly into engagement with the pinion, the racks connected to one of the blocks engaging the side of the pinion opposite the side engaged by the racks connected to the other of the blocks,
one of the cams driveably connected to one of the blocks for moving the block in a transverse direction, the racks connected to said block acting through the pinion and racks connected to the other of the blocks to move said other of the blocks in the opposite transverse direction,
the gripper bars being connected to the blocks for transverse movement therewith and for axial and vertical movement with respect thereto.

2. The apparatus of claim 1 wherein the
cam drive means has three coaxial cams,
and wherein the cam connected to the block is a first face cam having a first cam groove which is connected to the block by first linkage assemblies having a first cam follower positioned in the first cam groove,
wherein one of the cams is a second face cam having a second cam groove which is connected to the vertical moving means by second linkage assemblies having a second cam follower positioned in the second cam groove, and
wherein a third cam is a barrel cam having an axial curve cam ridge and third cam followers connected to the cam ridge and third linkage assemblies connected to the third cam followers connected to the axial moving means.

3. The apparatus of claim 1 wherein the
cam drive means has exactly one barrel cam and two face cams coaxially mounted on a common shaft,
and wherein the cams are connected to the moving means by linkage assemblies.

4. The apparatus of claim 1 wherein
the cams are connected to the gripper bars by linkage assemblies.

5. The apparatus of claim 1 wherein the
cam drive means has no more than one barrel cam and two face cams coaxially mounted on a common shaft,
wherein said vertical and axial moving means are connected to each of the gripper bars,
and wherein the cams are connected to the moving means by linkage assemblies.

* * * * *